Nov. 6, 1928. 1,690,541
A. R. KUZELEWSKI
FLUID OR AIR CONTROLLING AND OPERATING DEVICE
FOR MACHINE TOOLS OR THE LIKE
Filed April 2, 1924 5 Sheets-Sheet 1

Inventor
A. R. Kuzelewski.
By his Attorney
Francis Marbury

Nov. 6, 1928. 1,690,541
A. R. KUZELEWSKI
FLUID OR AIR CONTROLLING AND OPERATING DEVICE
FOR MACHINE TOOLS OR THE LIKE
Filed April 2, 1924   5 Sheets-Sheet 2

Nov. 6, 1928.  1,690,541
A. R. KUZELEWSKI
FLUID OR AIR CONTROLLING AND OPERATING DEVICE
FOR MACHINE TOOLS OR THE LIKE
Filed April 2, 1924    5 Sheets-Sheet 3

Inventor
A.R. Kuzelewski.
By his Attorney
Francis Marburg

Nov. 6, 1928.  1,690,541
A. R. KUZELEWSKI
FLUID OR AIR CONTROLLING AND OPERATING DEVICE
FOR MACHINE TOOLS OR THE LIKE
Filed April 2, 1924     5 Sheets-Sheet 4

Inventor
A. R. Kuzelewski
By his Attorney

Patented Nov. 6, 1928.

1,690,541

UNITED STATES PATENT OFFICE.

ADALBERT R. KUZELEWSKI, OF NEW YORK, N. Y., ASSIGNOR OF ONE-HALF TO MARBURG BROTHERS, INC., OF NEW YORK, N. Y., A CORPORATION OF NEW YORK.

FLUID OR AIR CONTROLLING AND OPERATING DEVICE FOR MACHINE TOOLS OR THE LIKE.

Application filed April 2, 1924. Serial No. 703,834.

My invention relates to fluid controlling and operating devices for machine tools or the like, and its main object consists in gripping or holding work pieces or in changing positions of parts of machinery for any reason whatsoever, and to accurately control the periods during which such parts or objects are to be gripped or held in predetermined positions. Novel features of my devices consist in the peculiar construction of a fluid control device. Other novel features relate to peculiar combinations of my fluid control device with fluid driven devices. Heretofore only revolving cams, cranks or eccentrics were used. Fluid operated devices were also proposed for operating machine tools, in combination with valves which latter in turn were operated by cams and drums, etc. As compared herewith my devices are simple and may act in straight lines of pull or push, being adapted to operate or grip objects of greatly varying sizes or shapes, as a result of the elastic features of my devices.

An important feature of my fluid control device or valve, is that it contains simple means of adjusting for timing fluid pressure within fluid operated devices, as will be explained later on, while devices operated by cams or cranks, etc. as used heretofore, do not contain simple means for regulation or adjustment, nor do they contain the elastic features of my devices mentioned hereinbefore, thereby giving my devices a broader field.

Referring now to the attached drawings which show a few designs illustrating my invention and the application thereof to machine tools or the like, Figs. 1 to 3 represent a design of my automatically operated air or fluid control valve or device, Fig. 1 being an end view, Fig. 2 being an axial section on line 2—2 of Fig. 3, and Fig. 3 being a vertical section on line 3—3 of Fig. 2. Fig. 9 shows a drill press to which my fluid controlling and operated devices may be applied, while Figs. 10 and 11 show a lathe to which several fluid controlling and operated devices may be applied.

Referring now more particularly to Figs. 1 to 3, 10 represents a shaft, 35 is a gear for revolving the shaft, 11 and 17 being respectively threaded portions of the shaft, 12 being a valve screwed adjustably on the threaded portion 11. 13 is another valve, surrounding valve 12, while 16 is a nut on the threaded portion 17 of shaft 10. It will be seen that if nut 16 is screwed tight against valve 13, the latter is forced against valve 12 and the two valves are firmly locked against each other, forming substantially one valve. If nut 16 is loosened each of the two valves may be turned individually and may be adjusted angularly in relation to the other valve, whereupon the valves may again be locked in their new relative positions. 14 is a casing surrounding the outer valve 13, the latter being closely fitted within the casing, the valve being mounted rotatively therein. 18 is an end cover for the casing, being conveniently fastened thereto by screws 19. The end surfaces of both valves and the face of the cover 18 are within a vertical plane through the axis of the valves and the respective faces of the valves and cover are carefully finished. 34 is a spring within the casing 14, being so arranged that it presses against valve 13, thereby pressing both valves against end cover 18, forming a substantially air tight joint between the valves and the cover. 20 may be a packing and 15 may be an elastic metal packing ring or the like, 22 may be a gland and 21 may be an extension of valve 12, 25 being a bore within the extension, 26 being a port within said valve connecting with bore 25, 27 and 28 being ports within the cover 18 and 29 being a threaded opening for connecting a pipe or hose to the cover. As shown herein the bore 25 may be in communication with ports 26, 27 and 28. 30 and 31 are ports within valve 13. 32 is a port within casing 14. As shown, ports 30, 31, and 32 communicate with each other, but in the present positions of the valve said ports do not communicate with ports 27 and 28, which latter may be in permanent open communication with a fluid or air operated device, as will be more fully explained later on. Port 32 in casing 14 and ports 31 and 30 may be permanently in open communication with the atmosphere.

Figure 1:
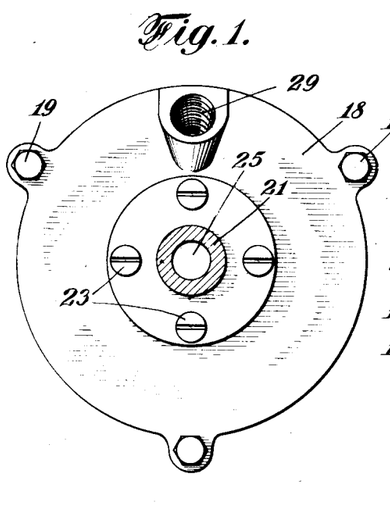
Figure 2:
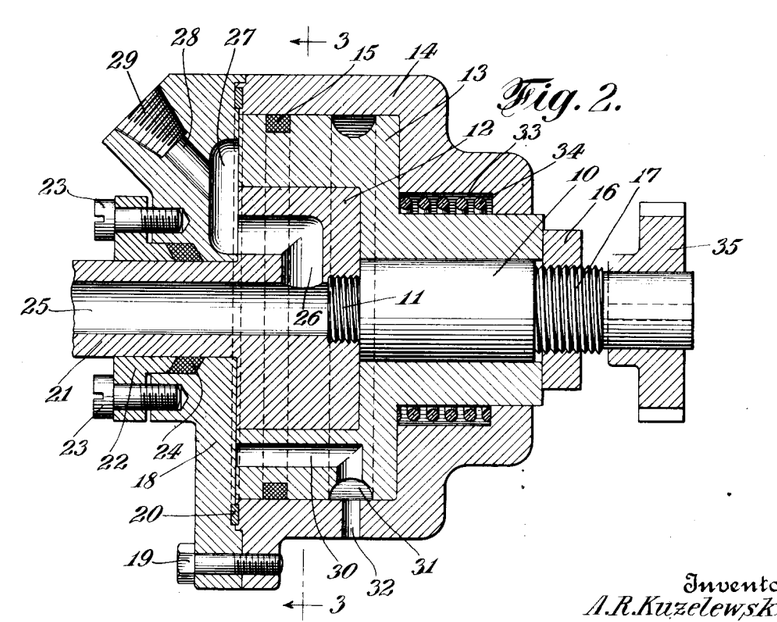
Figure 3:
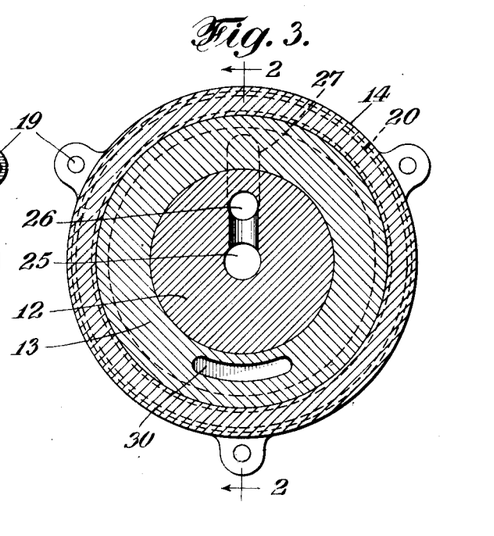

In explaining the action of the valve or device, it must be understood that bore 25 communicates with some source of air or fluid which may be under greater or lesser than atmospheric pressure, usually compressed air being at service. We presume that the source of air or fluid at present communicates as shown herein with port 28, the latter communicating in turn with some air or fluid operated device. If the valves are now revolving until they are turned nearly 180 degrees, it will be seen that ports 30, 31 and 32 will be in direct communication with ports 27 and 28 and the latter, as well as the fluid operated device, will therefore be in direct communication with the atmosphere. At the same time port 26 has been revolved the same number of degrees and the source of fluid is therefore entirely cut off from the valve and from ports 27 and 28. If now the valve or valves revolve again about 180 degrees, they will again be in their original position and the source of fluid will again be in direct communication with ports 27 and 28 and with said fluid operated device.

Referring to the feature of adjustability of the valves 12 and 13 it should be explained that port 26 of valve 12 may control the timing of the fluid or air inlet into ports 27 and 28, while port 30 of the valve 13 may control the timing at which said ports 27 and 28 may be connected with the atmosphere. If the angular position of valve 12 is left unchanged, while valve 13 (Fig. 3) is adjusted and turned towards right and locked in this new position, the pressure relief will be retarded. If the valve 13 is adjusted and turned towards the left and locked in the latter position, the pressure relief will be advanced. Again, if valve 13 is left unchanged and if valve 12 is adjusted and turned toward the right or left respectively, and locked in either one of these positions, the inlet of compressed air or fluid may be advanced or retarded respectively. It will, therefore, be seen that compressed air or fluid may be admitted into the valve or the pressure within the valve may be relieved at any desired period of a revolution of the valve, or of a working cycle, thus offering a very simple and efficient means of adjustment. The valves preferably are round and arranged rotatively, and adjustable in such manner, that they may act in their capacity of controlling the fluid or air inlet or relief at proper periods, and it is preferable that they are arranged adjustably. The object of my fluid or air control valve will later on be more fully explained.

Figure 4:
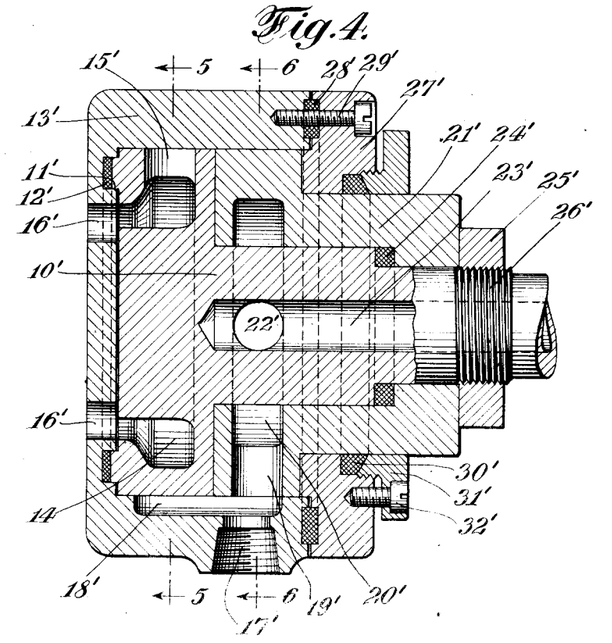
Figs. 4 to 6 represent another design of a valve, Fig. 4 being an axial section except a portion of valve 10' which is shown in plan view, Figs. 5 and 6 respectively, being vertical sections through the valve or valves on lines 5—5 and 6—6 of Figs. 5 and 6.
Figure 5:
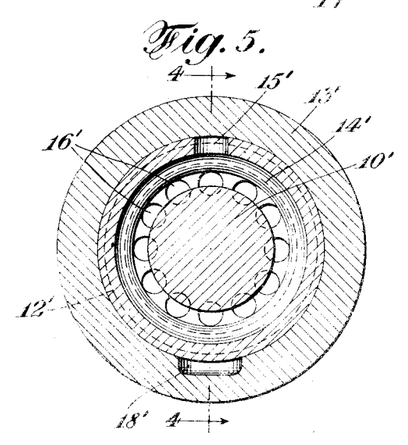
Figure 6:
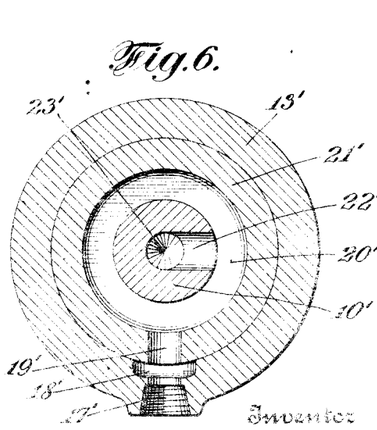

Referring now to Figs. 4 to 6, a different valve design is shown herein. 10' represents one valve, 21' is a second valve cooperating with valve 10', 26' is a threaded extension of valve 10', and 25' is a nut which may be pulled tight against valve 21', forcing the two valves towards each other whereby they may be locked in any desired relative angular positions, acting substantially like a single valve. 13' shows a casing, the valves being fitted substantially air tight within the casing, being mounted rotatively therein. 27' shows an end cover which may be fastened to the casing as shown. 12', 28' and 24' may respectively be packings, 31' being a gland for a stuffing box and 30' being a packing for the stuffing box. 23' is a bore within valve 10', 22' being a radial port, 20' being an annular port and 19' being again a radial port. 18' is a port at the peripheral inner surface of casing 13', 15' is a radial port within valve 10', 14' is an annular port and 16' represents a number of air holes within the end portion of the casing 13', whereby permanent open communication may be established between port 14' and the atmosphere. 11' shows a slight clearance space between one end surface of valve 10' and the end surface of casing 13', the valve bearing against packing 12', forming a substantially air tight joint. The operation of the valve or valves is as follows: In the position shown, bore 23', which may be in permanent communication with a source of compressed air or a vacuum, as the case may be, connects through ports 22', 20', 19' and 18' with opening 17', the latter in turn communicating with some air operated device. If the valves now revolve about 180 degrees, communication will be established between said air operated device and the atmosphere through ports 18', 15', 14' and through air holes 16'. The port 19' has simultaneously revolved the same number of degrees and the compressed air or vacuum, as the case may be, has been entirely cut off from port 18'. If the valves continue to revolve again about 180 degrees, they may again be in their original position, and the source of compressed air or vacuum may be once more in direct communication with the air operated device.

Referring to the adjustability between valves 10' and 21', they may be locked together in any relative positions. After they are thus locked they may act substantially like a single valve. If a source of compressed air is used, ports 19' of valve 21' controls the timing of the air inlet (Fig. 6). Similarly port 15' of valve 10' controls the timing of the air outlet into the atmosphere, or in other words, the pressure relief. The total period during which the port 18' may be in communication with either the source of compressed air or with the atmosphere during each revolution of the valve, depends on the width of ports 18', 19' and 15' (Figs. 5 and 6). It will be readily seen that if the angular relation of valves 10' and 21' in this design be adjusted, the relation of the timing of pressure inlet and pressure relief, may be adjusted as desired. If the valves are mounted on a camshaft, revolving with the latter, as will later on be more fully explained, and if the timing in relation to the camshaft must be changed, this may also be done by using an adjustable coupling between the valves and camshaft, such as are commonly known and used for driving mechanisms and which, therefore, need not be shown or explained.

Figure 7:
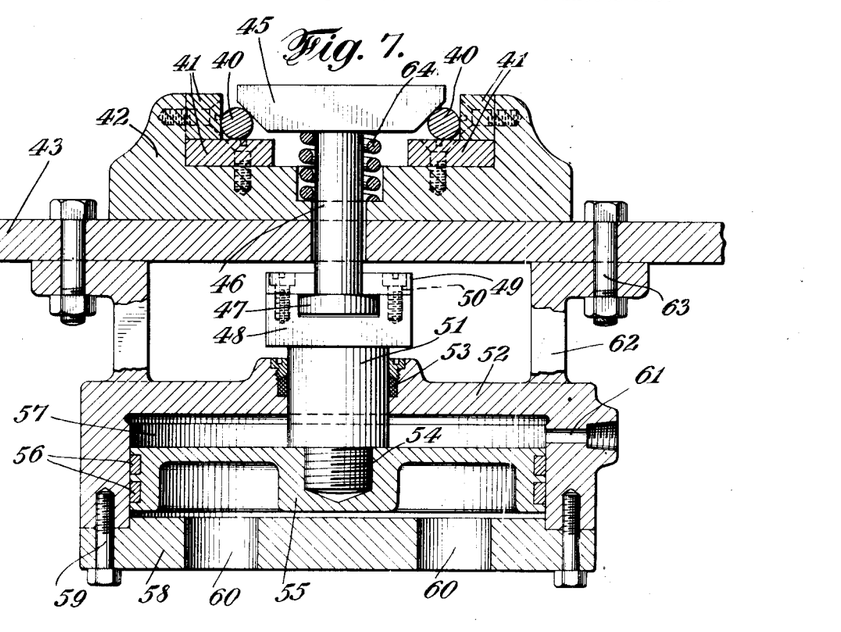
Figs. 7 and 8 represent a fluid or air operated device, containing a cylinder, the latter containing a piston, means being shown for connecting the latter with a vise for clamping or gripping work pieces, said fluid operated device being controlled by said fluid controlling device shown in Figs. 1 to 6, in combination with a source of fluid or air under different than atmospheric pressure. Compressed air is preferably used in applicant's device, wherever it is convenient to connect to compressed air, but any kind of fluid, being under a greater or lesser than atmospheric pressure, may be used.
Figure 8:
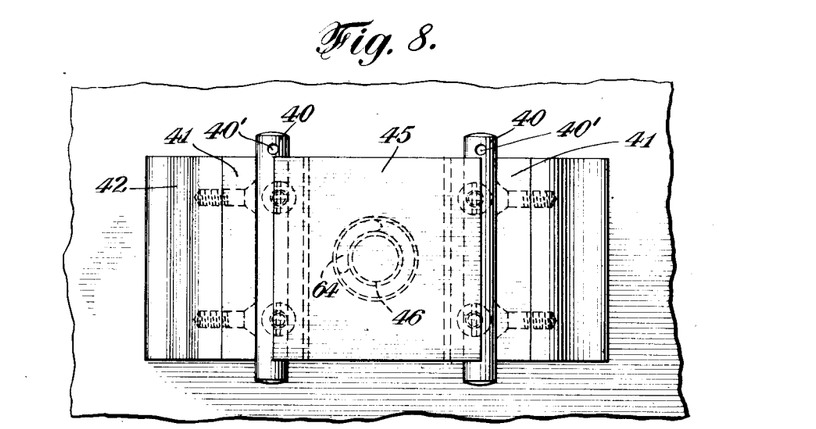

Figs. 7 and 8 show a fluid or air operated device being operated preferably by compressed air or by a vacuum, controlled by a valve of a design as shown hereinbefore. 52 represents an air cylinder or housing, 61 may serve both as air inlet and air outlet, 55 showing an air operated piston, 56 showing piston rings serving as air packing, 58 being a cover for the cylinder mainly for keeping out dust and 60 being holes establishing permanent communication between the space below the piston and the atmosphere. 51 may be a shaft, 48 may be an enlarged portion of the shaft while 54 may be a threaded portion of the shaft, which latter may be screwed into the piston. 49 may be a top plate for part 48, 46 may be another shaft, 47 may be an enlarged portion of the latter shaft, being fitted between the part 48 and the top plate 49 in such manner that it may rock slightly. 45 is a vise plate preferably being of hardened steel and it may be one piece with shaft 46. It is not essential that said parts are as described, one single shaft may be employed for connecting the piston and vise plate, except in case it is desired that the connection contains a loose joint permitting the vise plate to grip a number of work pieces uniformly even if the latter are of somewhat different sizes. 64 may be a spring being compressed. 43 may be a frame, 62 may be an extension of cylinder 52, the extension preferably being fastened to frame 43 as shown. 42 shows a vise which may be fastened to frame 43, in any convenient manner. 41 shows vise jaws preferably being of hardened steel, being fastened to vise 42 by means of screws as shown. 40 represents pins or shafts which require to be worked in some manner and which, as shown, are clamped down between vise plate 45 and jaws 41. The inlet 61 of the cylinder may be connected by means of a pipe, hose or otherwise, to the valve outlet 29 as shown in Fig. 2 or to the valve outlet 17', shown in Fig. 4, as the case may be, the air or fluid pressure or vacuum within the cylinder or housing 52 being controlled and timed by a control valve, such as explained hereinbefore.

The operation may be as follows: We presume a source of compressed air is being used and that the valve is connected to said source and is in position to permit compressed air to flow into the cylinder or housing, the piston 55 being pushed downward, pulling the plate 45 down on pins 40 which latter are gripped or held tight, preferably on three line contacts between plates 45 and jaws 41, whereupon the pin or several pins, as the case may be, may be worked in any desired manner. It is clear that if the respective control valve revolves, the valve outlet 29 or 17', will, after a predetermined portion of one revolution of the valve, be connected with the atmosphere and consequently there will be atmospheric pressure within the cylinder or casing 57, whereupon the piston 55 is pushed by spring 64 in upward direction, the plate 45 is lifted, thus releasing the pin or pins 40, which latter may be removed and new work pieces may be inserted into the vise. After the valve revolved further through a predetermined angle, compressed air will again be admitted into the cylinder 57 and the vise will be closed on the new pins, whereupon the same working cycle may be repeated as before.

Figures 9, 10:
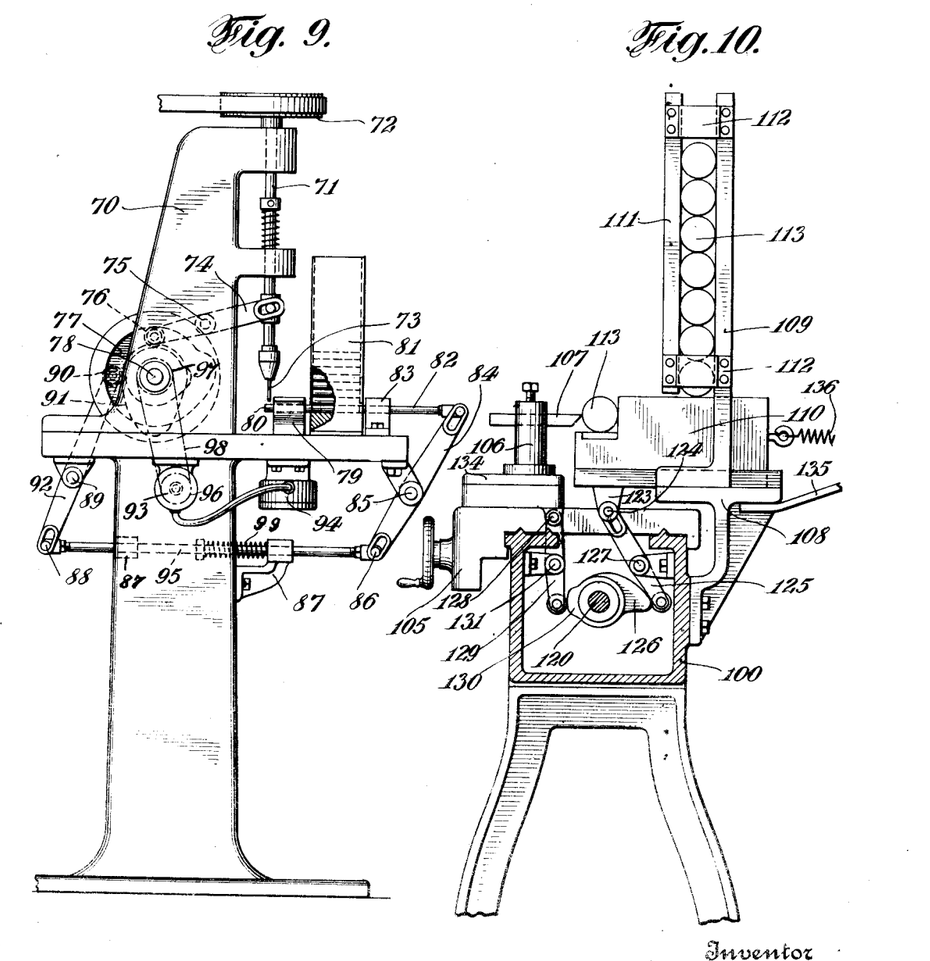

Fig. 9 shows a side elevation of a drill press, such as is universally used, except being novel in being arranged to be operated in connection with a fluid control valve and automatically operated clamping device such as described hereinbefore. 70 represents the main frame of the drill press, 71 is a drill spindle, 72 is a pulley which may be keyed to the drill spindle and driven by a belt. The drill spindle is arranged revolvably and axially movable in bearings provided therefor as shown. A collar $a$ may be pinned to the spindle, $b$ and $c$ may respectively be upper and lower ball bearing collars, the latter being separated from each other by balls, collars $b$ and $c$ and the balls, as shown, forming an end thrust bearing. Collars $b$ and $c$ may loosely fit around the spindle, permitting the latter to slide axially therein. F may be a spring pressing axially against the collars $a$ and $b$, normally counteracting the weight of the spindle, if desired. Spring F and collar $b$ may revolve with the spindle, while the collar $c$ may rest stationarily on a spindle bearing, as shown. $e$ may represent two collars, the latter being pinned to the spindle, while d may be a collar, fitted loosely around the spindle, between collars e, permitting the spindle to revolve freely. 73 is a drill, 78 is a camshaft, 77 is a cam, 76 is a roller, 74 is a two-armed lever, 75 is a pivot on which lever 74 may swing. A chain wheel 137 may be firmly attached to the camshaft and driven slowly by a chain, as shown, or in any convenient manner, while spindle 71 may be revolved rapidly. It is clear that if the drill spindle is rapidly revolved, while gear 137 is slowly turned, the latter completing one turn during each working cycle, the spindle may at predetermined periods, during each working cycle, be pressed down or lifted, as desired, depending on the selected shape of cam 77. 91 is another cam, 90 is another roller, 89 may be a pivot, 92 may be a two-armed lever which may swing on pivot 89, 95 may be a rod, 87 are bearings, 99 is a spring 86 and 88 being pins on the rod, 85 being a pivot, 84 being a lever which may swing on pivot 85, 82 may be a push rod, 83 may be a bearing for the push rod. 81 illustrates a magazine containing pins or work pieces. 80 is one of the pins or work pieces in position ready for work. 94 represents one of my automatic fluid operated cylinders or devices, 93 represents one of my fluid control valves or devices, the latter and the cylinder being connected by an air pipe or hose or the like. 79 illustrates an automatic clamping device, the latter being operated by a piston or the like within the gas operated device 94, as explained hereinbefore. A chain wheel 97 may be attached to the camshaft and a chain wheel 96 may be attached to a shaft operating an air valve 93, the two wheels being connected together, by means of a chain 98, as shown, or in other known manner. 94 is an air operated device and 79 is a clamping device, such as explained hereinbefore. The air valve may be mounted either directly on the camshaft or driven by means of a gear or chain as shown herein, but it is essential that it is accurately timed to the cam-shaft, in order to perform certain work at predetermined periods of a working cycle, or of a succession of working cycles.

I now will explain more fully the operation of my devices in combination with the said drill press. The drill spindle and camshaft may be continuously revolving, the control valve 93 may at present admit compressed air or fluid into the device 94, whereby the clamping device may be forced down on pin or pins 80 the latter being firmly gripped in vise 79. Through the action of cam 77 and lever 74, the drill spindle 71 is now being forced down and drilling takes place. As soon as drilling is completed, cam 77 causes the drill spindle to move upward again and immediately valve 93 releases the air pressure within the air operated device 94 and as a result the clamping device releases the pin or work-piece. Immediately thereafter the cam 91 by means of lever 92, shaft 95, lever 84 and push rod 82, pushes another pin contained within the magazine into the clamping device, provision being made that the old pin which has just been drilled, may drop into a box below. The valve 93 now permits compressed air to enter again into the device or cylinder 94, the clamping device again firmly grips the new pin and cam 77 again forces down spindle 71. The same cycle as described hereinbefore may be repeated automatically as often as desired, in other words, the machine is fully automatic. This machine illustrates a simple example how my valve and clamping device may be employed. Instead of using the two cams 77 and 91 as shown, additional air devices, similar to those shown herein, may be employed for pushing down the drill spindle and for pushing a new pin into the vise at the proper period of the working cycle, if so desired. In some cases one control valve may be employed for operating several pistons or devices, each piston performing a certain motion or operation at some particular place. It can be easily understood, for instance, that in a multi-spindle drill press one valve may control a plurality of similar gripping devices performing respectively in each case simultaneously substantially the same operation, provided the cams, if any are used, are correctly timed with said valve as in applicant's device. If several valves are being used the latter must be correctly timed in relation to each other, as will be further explained later on.

Figure 11:
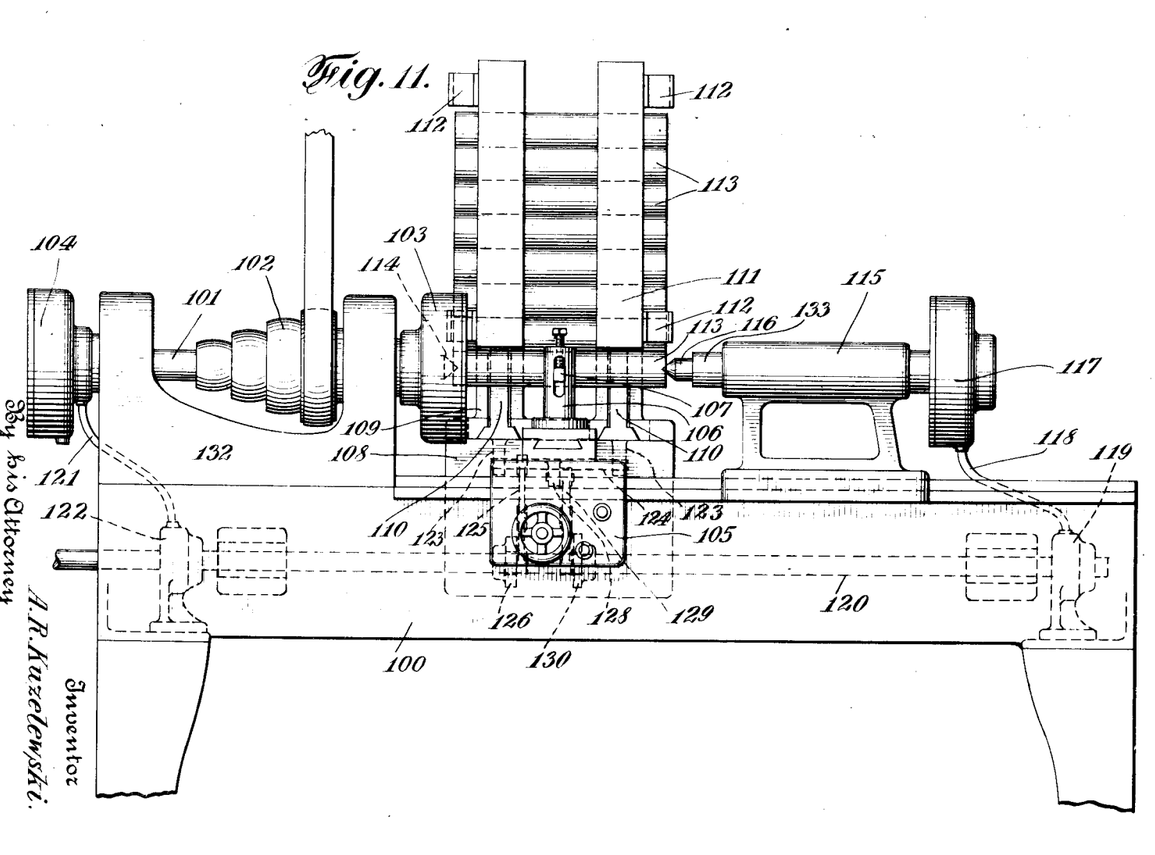

Another illustration of how my novel devices may be employed, will now be explained by referring to Figures 10 and 11. Figure 10 shows an end view of a lathe, partly in section and Figure 11 shows a front view thereof. 100 represents the frame or bed of the lathe, 132 represents a head stock, and 115 represents a tail stock, 133 may be the tailstock spindle, and 116 may be a center. 110 may represent two slides which may be adapted for feeding shafts or work pieces into positions between centers of the lathe. 109, 111 and 112 may represent parts of a magazine, 108 being a bracket for supporting the same. 113 may represent shafts within the magazine, one of these shafts being shown between lathe centers, 134 may be a slide or support, 106 and 107 may respectively represent a tool-holder and tool which may be mounted on slide 134. 105 may be an apron adapted for adjusting the tool slide 134 by hand. 101 and 102 may respectively be a spindle and pulley of the head stock, and 114 may be a center in the spindle, for centering the work pieces. 103 may represent a dog of some known design. 120 may represent a camshaft, 130 and 126 may be cams being mounted firmly on said camshaft, 129 and 125 may be levers and 131 and 127 may be pivots around which said levers respectively may swing. The camshaft is arranged rotatively and cam 130 may cause lever 129 to oscillate, whereby the latter may shift the slide 134 towards the center of the work piece while the work is being performed and away from the center after the work is finished. Slides 110 may be pushed towards the lathe center by means of cam 126 and lever 125 as will be explained later on. 135 may be a bracket and 136 may be a spring being arranged under stress between bracket 135 and slide or slides 110 and being adapted to pull slide or slides 110 towards right. All of the said parts are as universally used in lathes or in semi-automatic lathes, requiring therefore no special explanation.

The novel features relating to the application of my devices to a lathe or semi-automatic machine tool of this character will now be explained. 119 (Fig. 11) represents a control valve or device being mounted on camshaft 120 and 117 represents a fluid or air operated device, both of these devices being substantially as shown and described hereinbefore in Figs. 1 to 8. The valve may be driven slowly, through a sprocket wheel 139 and a chain, in such manner that it preferably makes one revolution for each working cycle, it being essential that the valve is timed accurately in relation to the cams or camshaft. The valve or valves preferably are mounted on the camshaft as shown herein. 118 may be a pipe or hose or the like, establishing communication between the valve and the fluid operated device 117. The latter may be mounted directly on the tail stock and the piston within the device may be mounted directly on the tail stock spindle. 138 may be a tank containing compressed air or fluid under greater or lesser than atmospheric pressure and 137 may be a pipe or hose connecting the tank with the camshaft, which latter may be hollow, the arrangement permitting air to pass from the tank into the valve 119, substantially as shown in Figures 1 to 6, and from the valve into the air operated device 117, the latter being operated substantially like the device shown in Fig. 7. The action of my devices may be understood by studying Figures 1 to 8 in combination with Fig. 11. We presume the camshaft revolves and that the valve is in position admitting compressed air into the device 117. The piston and tail stock spindle are pressed towards left, the center 116 being pressed towards the work piece, whereby the latter is accurately centered. Immediately thereafter the dog 103 which may continuously revolve at working speed, grips in known manner the work piece and revolves the latter. Cam 130 (Fig. 10) pushes the tool slides 134 carrying the tool towards the work piece and the work is beginning. As soon as the work is completed, cam 130 permits the slide 134 to be moved away from the work piece by means of a spring, or otherwise, and valve 119 cuts off compressed air, at the same time relieving the pressure within device 117, so that atmospheric pressure may be established within the device 117, the spring 64 (Fig. 7) may now push the piston and spindle towards right (Fig. 11) whereby the tail stock releases the work piece, which latter at the same moment is automatically released by the dog 103 and the work piece may drop into a box below. While the operation of finishing the work piece takes place, the cam 126 may permit the spring 136 to move the slide or slides 110 towards right, until at the furthest position towards right, one new shaft or work piece may drop onto the slide, whereupon cam 126 pushes slide or slides 110 again towards left. After the old work piece has been completed and dropped into the box below, the new shaft or work piece is being fed into working position between lathe centers. Immediately, the valve 119 permits compressed air to enter into the cylinder 117, pushing the piston and tail stock spindle again towards left whereby the new piece 113 is being held between centers, whereupon support or slide 134 carrying the tool-post is again moved towards the workpiece, and the operation of finishing the new workpiece begins and the same cycle may be repeated as often as desired.

The manner in which the dog is operated automatically has not been explained herein. It may suffice to say that 122 may be a control valve as shown and explained hereinbefore and 104 may be an air or fluid operated device such as also fully explained hereinbefore, 121 being a pipe or hose, whereby valve 122 and the operated device may be in communication with each other. The device 104 may be mounted stationary on the head stock, while a dog 103, of some known construction, may be mounted on the head stock spindle, revolving continuously at working speed, the arrangement being such, that through the action of valve 122, a piston within the device 104 may operate the dog in known manner, so that the work piece 113 may be automatically gripped or released at predetermined periods during each working cycle, thereby making the lathe fully automatic.

It is clear that my devices may be adapted to a great variety of mechanisms or machinery. The advantages of my system of air or fluid controlling and operating devices consist partly in simplicity and easy applicability at any desired point, by means of push or pull rod or otherwise. Another advantage is the flexibility of my devices making them adaptable to objects greatly varying in sizes or shapes. The advantages are especially great wherever large numbers of objects require identical operations which would otherwise take much time and careful attention of the operator. In other words, all advantages which ordinarily are obtained by more complicated automatic or semi-automatic machinery are also obtained through my simple devices.

Applicant prefers to use cams for functions and places for which they are best adapted and simultaneously or successively employs fluid control and fluid operated devices, as shown and explained, for gripping work pieces or for accomplishing work for which his devices are well adapted and at points which can more easily be reached by fluid operated devices than by cam operated mechanisms or the like. My invention is particularly of value in combination with machine tools or the like, wherein complete working cycles are automatically or semi-automatically repeated for quantity production.

The expression "complete working cycle," as used in the claims, includes the feeding or placing in position of a workpiece, the gripping of the latter, the actual cutting or working and the subsequent release of the piece.

Various modifications may be made in the invention without departing from the spirit thereof and the present exemplifications are to be taken as illustrative and not limitative thereof.

I claim:

1. In a machine tool or the like, a fluid control device consisting of a casing, a fluid inlet and relief for said casing, two valves being mounted movably within said casing, the said valves respectively controlling and timing said fluid inlet and relief, means for adjusting each of the said valves and for locking the said valves in different relative positions, whereby the timing of the said valves may be adjusted independently as desired, substantially as and for the purpose set forth and explained.

2. In a machine tool or the like, a fluid control device consisting of a casing, a fluid inlet and relief for said casing, two valves being mounted movably within said casing, the said valves respectively controlling and timing said fluid inlet and relief, means for adjusting the one of the said valves and for locking the said valves in different relative positions, whereby the timing of the said valves in relation to each other may be adjusted as desired, substantially as and for the purpose set forth and explained.

3. In a machine tool or the like, a fluid control device consisting of a casing, a fluid inlet and relief for said casing, two valves being mounted rotatively within said casing, the said valves respectively controlling and timing said fluid inlet and relief, means for adjusting the one of the said valves and for locking the said valves in different relative angular positions, whereby the timing of the said valves in relation to each other may be adjusted as desired, substantially as and for the purpose set forth and explained.

4. In a machine tool or the like, a fluid control device, consisting of a casing, a fluid inlet and relief for said casing, two valves mounted rotatively within said casing, the said valves respectively controlling and timing said fluid inlet and relief, means for adjusting each of said valves and for locking the said valves in different relative angular positions, whereby the timing of said valves may be adjusted independently, as desired, substantially as and for the purpose set forth and specified.

5. In a machine for automatically producing a work piece, a source of fluid being under a greater or lesser than atmospheric pressure, a fluid operated device, a fluid control device, two valves arranged rotatively within said control device, a fluid inlet and a fluid relief port being provided for said control device, said source, control device and fluid operated device being inter-connected and so arranged, that during one complete working cycle and during rotation of said valves, fluid may flow through said inlet port and control device into said fluid operated device and successively may flow back into said control device and out of said relief port, means being provided for regulating and timing the angular relations of said valves in such manner, that the flow of said fluid in either direction, may be regulated and timed as desired during said period.

6. In a machine for automatically producing a work piece, a source of fluid being under a greater or lesser than atmospheric pressure, a fluid operated device, a fluid control device, two adjustable valves being arranged rotatively within said control device, said valves revolving 360 degrees in one direction during one complete working cycle, means being provided for interconnecting said source and respective devices and for timing said valves in such manner, that said fluid is automatically operating said fluid operated device at a predetermined period of time during said cycle.

7. In a machine for automatically producing a work piece, a source of fluid being under a greater or lesser than atmospheric pressure, a plurality of fluid operated devices, a plurality of fluid control devices, two valves being arranged rotatively within each of said control devices, said valves revolving in a single direction during a complete working cycle, means being provided for interconnecting said source with one each of said respective devices, and for timing said valves respectively in such manner, that said fluid may pass from said source through said respective control devices during a predetermined period or periods of said cycle and whereby said fluid may automatically operate said respective fluid operated devices during said period or periods.

8. In a machine for automatically producing a work piece, a source of fluid being under a greater or lesser than atmospheric pressure, a plurality of fluid operated devices, a plurality of fluid control devices, a valve being arranged rotatively within each one of said control devices, a driven shaft revolving in a single direction during a complete working cycle, said valves being mounted on said shaft, valves revolving with the latter and being arranged independently adjustable thereon for the purpose of independently timing said valves, means being provided for connecting said source in series with one each of said fluid operated devices and control devices and for automatically operating said respective fluid operated devices through said fluid.

9. In a machine for automatically producing a work piece, a source of fluid being under a greater or lesser than atmospheric pressure, one or more fluid operated devices, one or more fluid control devices, one or more valves arranged rotatively within said control device or devices, one or more mechanisms for successively gripping and releasing said piece or pieces, means being provided, including said fluid and said control device or devices, for automatically operating said fluid operated device or devices, the latter in turn operating said mechanism or mechanisms, one or more cams, one or more tool slides, said cam or cams being so arranged in relation to said slide or slides that the latter may thereby respectively be operated, substantially as and for the purpose set forth and specified.

10. In a machine for automatically producing a work piece, a source of fluid being under a greater or lesser than atmospheric pressure, one or more fluid operated devices, one or more fluid control devices, one or more valves arranged rotatively within said control device or devices, one or more mechanisms for successively gripping and releasing said piece or pieces, means being provided, including said fluid and said control device or devices, for automatically operating said fluid operated device or devices the latter in turn operating said mechanism or mechanisms, one or more cams or the like, a shaft revolving only in one direction during a complete working cycle, said cam or cams being mounted on said shaft revolving with the latter, one or more tool slides, said cam or cams respectively operating said slide or slides, substantially as and for the purpose set forth and explained.

11. In a machine for automatically producing a work piece, a source of fluid being under a greater or lesser than atmospheric pressure, one or more fluid operated devices, one or more fluid control devices, one or more valves arranged rotatively within said control device or devices, one or more mechanisms for successively gripping and releasing said piece or pieces, means being provided, including said fluid and said control device or devices, for automatically operating said fluid operated device or devices the latter in turn operating said mechanism or mechanisms, one or more cams or the like, a shaft revolving only in one direction during a complete working cycle, said valve or valves and said cam or cams being mounted on said shaft revolving with the latter, one or more tool slides, said cam or cams respectively operating said slide or slides, substantially as and for the purpose set forth and explained.

12. In a machine for automatically producing a work piece, a source of fluid being under a greater or lesser than atmospheric pressure, one or more fluid operated devices, one or more fluid control devices, one or more valves arranged rotatively within said control device or devices, one or more mechanisms for successively gripping and releasing said piece or pieces, means being provided, including said fluid and said control device or devices, for automatically operating said fluid operated device or devices the latter in turn operating said mechanism or mechanisms, one or more cams or the like, a shaft revolving only in one direction during a complete working cycle, said valve or valves and said cam or cams being mounted on said shaft revolving with the latter, one or more tool slides, said cam or cams respectively operating said slide or slides, substantially as and for the purpose set forth and explained, and means for adjusting the timing of said valve or valves in relation to said cam or cams, as desired.

Signed at New York city, in the county of New York and State of New York this 31st day of March A. D., 1924.

ADALBERT R. KUZELEWSKI.